(12) United States Patent
Sarif

(10) Patent No.: US 7,117,990 B2
(45) Date of Patent: Oct. 10, 2006

(54) CREDIT-CARD MODULAR TWO-COMPONENT WALLET-READER SET

(75) Inventor: Richard L. Sarif, Carlsbad, CA (US)

(73) Assignee: SoirtRX, Inc., San Diego, CA (US)

( * ) Notice: Subject to any disclaimer, the term of this patent is extended or adjusted under 35 U.S.C. 154(b) by 187 days.

(21) Appl. No.: 10/862,639

(22) Filed: Jun. 7, 2004

(65) Prior Publication Data

US 2004/0256249 A1     Dec. 23, 2004

Related U.S. Application Data

(60) Provisional application No. 60/476,846, filed on Jun. 9, 2003.

(51) Int. Cl.
*A45C 11/04* (2006.01)
*G02C 1/00* (2006.01)
*G02C 1/02* (2006.01)

(52) U.S. Cl. .............. 206/5; 206/37; 206/38; 351/65; 351/110

(58) Field of Classification Search ............ 206/5–6, 206/38–38.1, 37; 351/56, 62, 103, 109, 110, 351/126; D16/302–303, 314–315; D3/265–266
See application file for complete search history.

(56) References Cited

U.S. PATENT DOCUMENTS

| | | | |
|---|---|---|---|
| 132,246 A | 10/1872 | Buckley | |
| 272,450 A | 2/1883 | Manning | ................ 206/5 |
| 361,724 A | 4/1887 | Shailer | |
| 1,167,953 A | 1/1916 | Uhlemann | |
| D80,150 S * | 12/1929 | Spill | ................ D16/315 |
| 1,842,599 A * | 1/1932 | Fraser | ................ 206/5 |
| 1,919,938 A * | 7/1933 | Fielding | ................ 351/65 |
| 1,978,486 A | 10/1934 | Coombs | ................ 88/47 |
| 2,004,445 A * | 6/1935 | Meyer | ................ 351/65 |
| 2,098,513 A | 11/1937 | Nerney | ................ 88/45 |
| 2,650,700 A * | 9/1953 | Wolf | ................ 206/5 |
| 5,015,087 A | 5/1991 | Baratelli | ................ 351/65 |
| 5,037,192 A * | 8/1991 | Arad | ................ 351/65 |
| D322,262 S | 12/1991 | Manus | ................ D16/102 |
| 5,110,197 A | 5/1992 | Arad | ................ 351/41 |
| 5,274,404 A | 12/1993 | Michael | ................ 351/126 |
| 5,748,280 A | 5/1998 | Herman | ................ 351/110 |
| 6,371,614 B1 | 4/2002 | Herman | ................ 351/126 |
| 6,773,106 B1 * | 8/2004 | Herman | ................ 351/126 |
| 2002/0191150 A1 | 12/2002 | Herman | ................ 351/126 |

* cited by examiner

*Primary Examiner*—Byron P. Gehman
(74) *Attorney, Agent, or Firm*—Frank G. Morkunas

(57) ABSTRACT

A credit card modularized set having a flexible stow envelope for receiving a companion nose-clasping type reading glasses, with a length and width approximately that of a conventional credit card; wherein as the set is stacked within a group of conventional credit cards, no portion of the set is substantially protrusive nor recessive of the stacked group. The reading glasses component has a special beam bridge portion having a square cross-sectional shape thereby affording maximum torsional resistance for its diminutive size plus a laterally tapering cross section evenly distributing any imposed bending loads. The modularized set has a minimal thickness enabling its user to slip the set conveniently within the user's wallet modularly among the user's credit cards for ready availability.

8 Claims, 1 Drawing Sheet

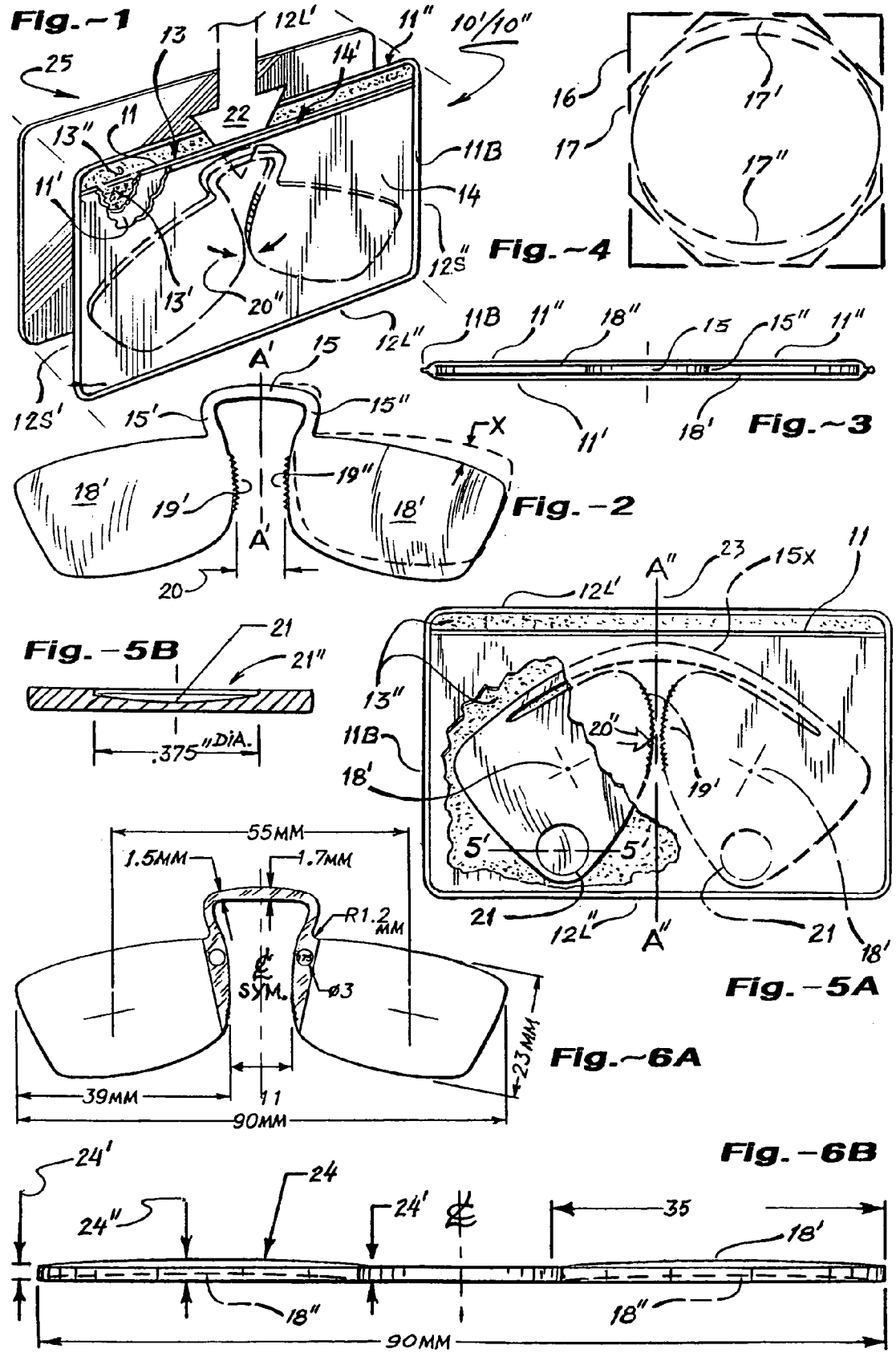

CREDIT-CARD MODULAR TWO-COMPONENT WALLET-READER SET

CROSS REFERENCES AND RELATED APPLICATIONS

This application claims the benefit of U.S. Provisional Application No. 60/476,846, filed on Jun. 9, 2003.

STATEMENT REGARDING FEDERALLY SPONSORED RESEARCH OR DEVELOPMENT

Not applicable.

BACKGROUND OF THE INVENTION

1. Field of Invention

This invention relates to well known so called Pince-Nez (French) or nose-pinching type reading glasses having a flexible bridge portion; plus, it also relates to well known wallet credit card holders.

2. Relevant Prior Art

Background research discovery provides some prior patent art regarded as germane to this disclosure, for example several discovered patents reveal "one piece" templeless eyeglasses having a common transversely interposed resilient plastic bridge portion, which bridge in its untensioned condition is said to bias the laterally opposed lenses sufficiently close together as to essentially grasp the upper portion of a user's nose there between close together as to essentially grasp the upper portion of a user's nose there between while being worn; hence the French derived term Pince-Nez, or nose-pinching eye glasses. The notion of templeless nose-pinching eyeglasses can be traced back several centuries to 1300's in Europe, when they employed a transverse rigid bridge affixed to the eyeglasses rims, and these lens rims were made so to adjustably clamp to the user's upper nose without lateral compliance.

In 1840 the true nose-pinching eyeglasses were conceived, employing a more aesthetic appearing transverse flexible bridge, which compliance obviated need for pre adjustment to the user's nose width. Then in 1890, the design trend swang to rimless lenses, wherein tiny holes were drilled longitudinally through the apposed lenses facilitating direct aesthetic attachment of the flexible bridge to the inward edges of the lenses; thereby eliminating a distracting presence of the lens rims. In 1916 U.S. Pat. No. 1,167,953 (filed: September 1913), W. R. Uhlemann introduced a novel vitreous (transparent glass) bridge member, which was integrally fused to the respective left and right lenses; yet this relatively fragile bridge construction offered no flexible adjustability to the user. In U.S. Pat. No. 2,098,513 (filed January 1934) is shown metal rimmed nose-pinching eyeglasses with the usual flexible metal bridge, but including opposed nose contact members which have closely spaced serrations serving to promote improved adherence of the eyeglasses upon a user's nose.

Then in UK Patent. #490,197 (filed: December 1937), Inventor J. P. Sidebottom introduced one piece frameless semi-flexible spectacles (eyeglasses) made of "an artificial molded material which is not glass", that is, die molded of acrylic thermoset/plastic resin called Perspex® (i.e., polynethyl-metacrylate); which set forth a pair of lenses formed in one piece with an integral if necessarily resilient bridge member portion (it is not known if inventor Sidebottom further contemplated bridge flexibility, in as much as he does not allude to it). However, non metal integrally formed bridges remained unknown until C. Baratelli's subsequent U.S. Pat. No. 5,015,087 (filed: April 1900; wherein above said inventor Sidebottom is erroneously referred to as J. Pearson), particularly identified in claim 1 which expressed the notion of a one piece plastic nose-pinching (Pince-Nez type) eyeglasses providing a more than resilient indeed "flexible" bridge portion. Additionally, Baratelli sets forth use of opaque coating or "masking" of the integral bridge portions (# . . . 087/Column 1, Lines: 49–51), owing as to thereby preclude spurious "piping in" of reflected/refracted light, which adverse effect was alleged to be found tending to obscure optical clarity to the degree of being visually annoying if possibly dangerous distraction to the wearer under certain ambient lighting conditions.

In. U.S. Pat. No. D322,262 (filed: December 1988) is shown a nose-pinching eyeglasses having a laterally adjustable metal bridge, which in FIG. 6 shows the lenses folded one atop the other by virtue of extending the bridge to its greatest length. In U.S. Pat. No. 5,110,197 (filed: January 1991 from Israel) is shown an "emergency eye glass" article which is tantamount to a flat plate of injection molded transparent plastic and dimensionally substantially the came as an ordinary credit card, but having a non adjustable nose slot formed from the lower elongate edge medially to two spaced apart integrally formed optical lens portions which are only protrusions formed beyond the nominal thickness of the eyeglasses card. In U.S. Pat. No. 5,274,404 (filed: April 1991) is shown an injection molded plastic nose-pinching eyeglasses having an integrally embedded flexible plastic (nylon suggested) or metal (stainless steel suggested) bridge, the notion being to enable the dependent lens potions to be readily folded against one another for compactness. In U.S. Pat. No. 6,371,614 (filed June 2000) and the inventor's related pending U.S. Pat. No. 2002/0191150 (filed April 2002) is shown a nose-pinching type eyeglasses comprised of two mirror image lens portions which in the pending iteration includes an integral flexible bridge specified as having an either circular (0.050 inch diam.), or oval or polygonal (0.050"×0.060", i.e.; not a parallelogram) cross section; and which the bridge is necessarily formed to a particular M shape as viewed from the front, a shape claimed to lend greater flexibility in nose-pinching action.

Finally, in U.S. Pat. No. 132,246 (filed: October 1872) the notion of a basic no frills rigid elongate eyeglasses case was presented, comprised of two concave stamped metal mirror image panels which are sheathed inwardly with felt material, and which perimeter flanges are permanently joined medially around three sides, leaving an open small end opening for insertion of one's eyeglasses into the crush resistant case. Next, an eyeglass case of simple flexible envelope design was introduced for nose-pinching eyeglasses via U.S. Pat. No. 272,450 (filed: April 1882), in which the conventional flexible metal bridge was employed further as to enable overlapped folding of the two lens portions. This was achieved by initial insertion of one lens portion within a discrete compartment divided by a medial layer of soft fabric, thereby protecting one lens portion from being scratched upon insertion of the other lens portion within its likewise discrete adjacent compartment. That embodiment was soon followed by U.S. Pat. No. 361,724 (filed: March 1887), wherein was presented a thin end opening eyeglass case featuring internal wiping pads of a felt material, serving to wipe the nose pinching type eyeglasses lens clean each time the eyeglasses were inserted or removed therefrom. However, none of these eyeglasses cases were adaptable to provide an embodiment suited to the ultra slim low profile criteria of my own immediate disclosure.

Therefore, in full consideration of the preceding patent review, there is determined a need for an improved form of device to which these patents have been largely addressed. The instant inventor hereof believes their newly improved nose eyeglasses, commercially referred to as: WALLE-TREADERx™, and currently being developed for production under auspices of the FlashlineProducts Mfg./Mkt.Co., exhibits certain advantages as shall be revealed in the subsequent portion of this instant disclosure.

SUMMARY OF THE INVENTION

In view of the foregoing discussion about the earlier invention art, it is therefore important to make it pellucid to others interested in the art that the object of this invention is to provide an eyeglasses remiss of usual left and right ear impinging temples, hence being of the nose-pinching type, albeit employing certain new properties enabling convenient carrying in a wallet's existing credit card compartment. Therefore, certain refinements critical to this manner of utilization necessarily include a maximum overall nominal thickness (i.e.; as measured longitudinally front to rear) measuring approximately $\frac{1}{16}$ part of an inch; hence, exhibiting no fore nor aft protrusions beyond this nominal plan view profile thickness dimension essentially established by my so called BeamBridge™ portion hereinafter referred to simply as beam bridge, so as to give the eyeglasses a true low profile quality. Moreover, the entire reading glasses are precision injection molded of polycarbonate resin plastic, thereby obtaining desired optical clarity, optical resolution, and inherent resistance to breakage.

Another object of this invention disclosure is to set forth an unprotrusively low profile article according to the preceding, wherein is also preferably included a special flexible beam bridge portion having a preferred $\frac{1}{16}$ inch squared (i.e.; right angled parallelogram) cross section; which front/rear surfaces are thus vertical, while top/bottom surfaces thereof are horizontal as normally observed upon a wearer, thereby taking full advantage of available cross section area. Thus compared to the relatively flimsy necessarily smaller cross sectional area of a conventional round, oval, or polygonal (i.e.; shape having more than four intersecting sides) cross sectional shapes for example, the square/cross section configuration advantageously provides an approximate 20%–22% additional beam cross sectional area, and approximate 33% greater torsional resistance. The beam bridge is preferably of inverted U shape (albeit not necessarily), with two laterally opposed bends creating downward projecting leg like bifurcations terminating where the beam bridge is integrally injection molded with the reading glasses transversely inboard left and right optical lens portions. Therefore, the beam bridge's uniquely maximized square cross section configuration exhibits both the desired transverse bending flexural compliance needed for variable fitting to various human nose widths, as well as providing the requisite maximum torsional resistance, making the reading glasses more stable when worn clasped upon opposing variously sloping sides of a human user's nose. A generic variant of my preferred beam bridge configuration, is the square/cross section formed to a transversely elongated formation, whereby the beam bridge terminates at the outer most upper corners of the left and right lens portions; thereby taking even further advantage of my square/cross section structural improvement as has already been described.

Additionally, it is preferred that the beam bridge employ a cross section of constant fore/aft thickness while gradually tapering from a maximum vertical/beam thickness at its central region toward its laterally opposed left and right end regions; thereby providing maximum fore/aft bending resistance while remaining within the critical purview constraint of said plan view profile thickness limitation, yet providing enhanced lateral compliance which is thus more resistive to breakage owing to a resultant even distribution of transverse bending loads.

Furthermore, the beam bridge being made of polycarbonate resin plastic in combination with said bending load distribution, the beam bridge can therefore be forced beyond its natural memory/yield point, whereby to manually bend the beam bridge dependent said lenses laterally apart is found to ease the pinching action upon the user's nose; and conversely, to manually bend to beam bridge laterally together is found to increase the pinching action upon the user's nose. This further structural quality can thus be put to advantage by the user, who can thereby manually adjust the tension imparted by the beam to their particular liking, much in the manner familiar to that of a conventional metal bridge member (which are found to be made of a constant transverse thickness).

Another object of this invention disclosure is to set forth the novel reading glasses according to the preceding objects, whereby to promote handy availability within one's wallet, is also included a credit card sized wafer thin parallelogram shaped elongated stow envelope. It is comprised of dual layers of flexibility pliant sheet like material such as thin quality gloss coated paper or Mylar® or just vinyl plastic having two oppositely conjoined (via well known ultrasonic fusing process) short sides edges, and including a third likewise conjoined long sided edge formed contiguously with each other; plus a fourth unjoined upper long side formed contiguously between the two short sided left and right edges. The forward panel thereof preferably including a slightly truncated (i.e.; abbreviated) lip, thereby enabling easier edgewise manual insertion or removal of the companion reading glasses as desired. Moreover, the paper iteration also includes a folding flap portion to the envelope, with perforations along its fold line across the op of the envelope; whereby the folded flap portion can be readily manually avulsed and discarded, leaving only the stow envelope portion for wallet use sans flap.

The relationship of the set's $1^{st}$ component stow envelope relative to the received eyeglasses is such that the stow envelope's width is shorter than the relaxed overall width of $2^{nd}$ component eyeglasses, thus enabling left and right outermost terminuses of said eyeglasses to tensionably impinge laterally outward against the internal pocket ends of said stow envelope; thereby frictionably holding said eyeglasses fast within said stow envelope.

A further option would be to include an additional panel later of transparent film such as mylar, thereby providing an optional pocket for insertion of a thin paper insert upon which one may provide personal information such as their name/address along with a postage stamp, handy in such event one's WALLETREADER™ should be inadvertently lost. This stow envelope therefore serves to protect opposing front and rear surfaces of its reading glasses from inadvertent scratching or marring while held within one's wallet credit card compartment; and to that end preferably also includes felt coated or alternately Teflon® coated internal lining surfaces to thereby further prevent marring or chafing of the eyeglasses optical surfaces. Moreover, it is thus deemed vital to the novel functional nature of this two component invention disclosure, that my stow envelope member portion is understood to be critically sized in length and width as to dimensionally stack conformably with a conventional array of credit cards, whereby no portion of the stow envelope is either protrusive nor recessive of adjoining group stacked credit cards; and is thereby regarded as being modular.

DESCRIPTION OF THE PREFERRED EMBODIMENT DRAWINGS

The foregoing and still other objects of this invention will become fully apparent, along with various advantages and features of novelty residing in the present embodiments, from study of the following description of the variant generic species embodiments and study of the ensuing description of these embodiments. Wherein indicia of reference are shown to match related matter stated in the text, as well as the Claims section annexed hereto; and accordingly, a better understanding of the invention and the variant uses is intended, by reference to the drawings, which are considered as primarily exemplary and not to be therefore construed as restrictive in nature; wherein:

FIG. 1, is a pictorial perspective view of my reading glasses assembled within the stow envelope as a cooperative set, and including a small fractured away portion at the upper left corner thereof serving to more clearly reveal both the required second layer as well as the optional third layer of pliantly flexible sheet material;

FIG. 2, is a front/elevation view of my $2^{nd}$ component nose-pinching reading glasses whilst in their natural relaxed condition (the unshown rear/elevation view being essentially identical thereto), and included at the right half thereto is a phantom outline showing the reading glasses staged biased outwardly away from the vertical center line of reference A'—A' much as they would be flexed while worn upon a users nose;

FIG. 3, is a semi diagrammatic top/plan view of FIG. 1, revealing a total absence of fore and aft protuberances thereof;

FIG. 4, is a diagrammatic 24× enlarged typical cross sectional representation of my beam bridge, as sliced along plane A'—A' of FIG. 2, wherein here are superimposed therewith phantom outlines identifying conventional bridges and thereby directly comparing their resultantly smaller cross sectional surface areas;

FIG. 5A, is a front/elevation view of a generic variant aviator style reading glasses having a greatly elongated integrally formed bridge and optional integrated finger holds, and is shown on the right half portion of the figure in an inwardly converged condition within the confines of the comparison stow envelope, while the portion to the left half of the vertical center line A"—A" shows the lens biased outwardly into a tensioned position much as they would be while worn upon the nose of a user;

FIG. 5B, is a 3× enlarged partial cross section sliced along plane of reference 5'—5' in FIG. 5A, showing one of two preferred optional integrated finger hold recesses;

FIG. 6A, is a quasi/technical layout front/elevation view showing various preferred dimensions of my reading glasses;

FIG. 6B is an approximate 2× enlarged upper/plan view iteration of FIG. 6A embodiment, wherein the only variances between the consecutive examples are those subtle dimensional differences (albeit not actually discernible to the unaided human eye) prescribing the different optical diopters to be made commercially available.

ITEMIZED NOMENCLATURE REFERENCES

10'/10"—modular set: $1^{st}$ component stow envelope/$2^{nd}$ component reading glasses
11,11'11",11B—pliant sheeting material: truncated edge, front layer/back layer, bead
12L'/12L",12S'/12S"—stow envelope's long edges: top/bottom, short edges: left/right
13,13"/13"—stow pocket, flock coating: inward of front layer/inward of back layer
14'/14"—stow pocket internal vertical pocket end portions
15,15'/15",15x—beam bridge: upper span, left bifurcation/right bifurcation, extended
16,16'/16"—special beam bridge cross section: under square, square, over square
17,17',17"—exemplified conventional bridge cross sections: polyhedral, circular, oval
18L/18R,18'/18"—Lenses: left/right, optic surfaces: forward convex, aftward concave
19'/19"—eyeglasses nose contact serrations: left/right
20/20'/20"—eyeglasses flexible condition: relaxed/laterally expanded/laterally contracted
21/21'/21"—eyeglasses diopter size ref. indicia, finger hold counterbore: left/right
22—eyeglasses insertion action ref. arrow
24,24',24"—Lenses: convex radius, nominal thickness, variable according to diopter
A'—A'—general vertical medial center line of reference
A"—A"—vertical center line of stow envelope illustrated in FIG. 5
25—exemplified existing credit card

DETAILED DESCRIPTION OF THE PREFERRED EMBODIMENTS

Initial reference is given by way of FIG. 1, wherein is exhibited a conventional standard planar wafer like credit card 25 spaced apart relative to my special two component WalletReaderx™ assembly, comprised of a 1st component stow envelope 10' and companion 2nd component reading glasses 10" (the latter component thereof being simply referred to hereinafter as the "eyeglasses"). The protective stow envelope portion 10' is basically make of pliant sheeting material, such as thin plastic sheeting or velum or thin coated paper, either of which panels bonded together along three contiguous perimeter sides designated as edges 12S'/12L"/12S", so as to form a useful stow pocket 13; while the forth side 12L' preferably remains open across the entire upper span as to readily receive (ref. action arrow 22) the necessarily manually contracted 20" (ref. converging opposed action ref. arrows) lens portions 18L and 18R. Note in both FIGS. 1&5A how it is preferred that the front layer panel 11' be slightly shorter via truncated edge 11, so as to make manual insertion of the lower edges of the lenses 18L and 18R easier. Additionally if desired, the stow envelope 10' may include an auxiliary transparent ID panel, which thus creates an auxiliary pocket in which may be kept the owner's phone number and return address if lost. Plus, the inward surface 13' of the front panel, and the inward surface 13" of the back layer panel, can be provided with a flock coating; as to prevent any tendency of the lenses to stick (although it has been found that a matte finish of the inward facing surfaces, instead of a gloss finish will generally obviate any such tendency). Once the eyeglasses 10" are so pocketed entirely within the stow envelope 10', the inherent leaf spring like tension resilience of the beam bridge iteration 15x of FIG. 5A) acts to impart a constant outward lateral impingement against the opposite internal vertical pocket ends 14' and 14" (see FIGS. 3 & 5A) of the stow envelope; thereby frictionably holding the eyeglasses impinged fast within the stow envelope confines as in FIGS. 1,3,5A. Accordingly, when needed, the user readily withdraws the eyeglasses 10" from the stow envelope merely by grasping the central portion of the beam bridge 15, whereby an easy pull extracts the eyeglasses whilst still tensionably impinging against pocket ends 14' and 14"; whereupon exiting therefrom, the respective eyeglass lenses 18L & 18R instantly recover springably to their natural relaxed condition 20 represented in FIG. 6A.

There remain subtle, however vital other differences which are to become herein more evident and understood as additional important improvements. For example, FIG. 2 demonstrates how my one piece plastic eyeglasses may if desired, be custom adjusted by the user more to their personalized liking, merely by forcing the lenses 18L and 18R apart in the manner suggested by the displacement of lens 18" toward the phantom outlined position X for example. However, with a conventional type constant thickness mono beam design, it was discovered that such a readjustment practice would eventually induce a fracturing stress condition, owing to bending loads which tend to concentrate proximal the transverse center of the beam bridge, ultimately resulting in failure of the beam member to the extent of complete breakage. Since it is nevertheless a natural desire for the user to either attempt to expand or converge the lens positions to suit their particular nose breadth, yet thereby in the process necessarily exceed the yield limit of the even the preferred highly durable polycarbonate plastic beam bridge 15. Such was the case when a user found the nose clasping effect between the eyeglasses nose contact serrations 19' and 19" to light for good stability upon their nose, then conversely, an opposite manually forced convergence readjustment of the lenses 18L and 18R could be executed to excise the tension they desired.

Considering the one piece plastic injection molded plastic construction, the particularly unique nose-pinching adjustability properties of my eyeglasses is attributed to their preferred novel gradually tapered beam bridge configuration. However subtle to observe, reference to FIGS. 5A and 6A, reveals that my most preferred beam bridge embodiment 15 actually gradually tapers from a maximum vertical beam thickness of say the indicated 1.7 mm for example proximal longitudinal center line A' A", to about 1.5 mm as is indicated at the laterally outward smaller vertical beam thickness approaching the lateral terminuses 15' and 15". In FIGS. 1, 2, & 6A, my beam bridge is shown to be of an inverted U shape; while FIG. 6A shows my alternate generic variant transversely tapering embodiment, which is not U shaped but more nearly linear in formation (although shown in a temporary extremely bowed condition, owing being contained within my stow envelope 10'). Therefore it was discovered that the structural beam breakage problem could be satisfactorily resolved by implementing what amounts to a mere 10% variation in vertical beam thickness, deemed sufficient to entirely eliminate the problematical beam breakage condition, by distributing the rebinding loads evenly along the entire length of the tapered/bridge beam. Now, with my tapered/beam bridge configuration, one user can adjust the eyeglasses nose breadth tension by momentarily expanding the inter ocular distance, whilst a subsequent user can conversely, momentarily converge the inter ocular distance as to thereby effect an increase in nose breadth pinching tension. While heretofore, this variable memory nose-pinching effect was indeed offered by the metal leaf type transverse bridge known to three piece nose-pinching eyeglasses, owing to the inherently more malleable characteristic of metal; albeit the overall structure of these traditional nose-pinching eyeglasses is relatively frail. Yet in a one piece molded plastic eyeglasses construction, the variable memory effect is considered a significantly novel technological advantage by those skilled in the art, as well as by discerning users who appreciate the ready "wallet availability" convenience offered by the necessarily greater overall "sit on it" durability of the one piece molded plastic construction.

Finally, FIG. 6B further reveals the ultimately low profile characteristic of my eyeglasses as viewed from above, noting that whilst the frontal radiused convexity 24 of the lens portions appears to extend past the nominal thickness reference of 24', it is understood that the overall thickness of the eyeglasses actually never exceeds the nominal thickness owing that the left and right lenses respective aftward concavity 18" essentially negates any actual increase in thickness relative to the indicated nom. thickness.

Thus, it is readily understood how the preferred and generic variant embodiments of this invention contemplate performing functions in a novel way not heretofore available nor realized. It is implicit that the utility of the foregoing adaptations of this invention are not necessarily dependent upon any prevailing invention patent; and, while the present invention has been well described hereinbefore by way of certain illustrated embodiments, it is to be expected that various changes, alterations, rearrangements, and obvious modifications may be resorted to by those skilled in the art to which it relates, without substantially departing from the implied spirit and scope of the instant invention. Therefore, the invention has been disclosed herein by way of example, and not as imposed limitation, while the appended Claims set out the scope of the invention sought, and are to be construed as broadly as the terminology therein employed permits, reckoning that the invention verily comprehends every use of which it is susceptible.

I claim:

1. Credit-card sized reading glasses set comprising:
    (a) a pliable stow envelope critically sized in length and width as to dimensionally stack with conventional credit cards; and
    (b) pince-nez eyeglasses removably insertable into and from said stow envelope, said pince-nez eyeglasses having a flexible beam bridge with a planar thickness and a rimless left lens attached to one side of said beam bridge and a rimless right lens attached to an opposite side of said beam bridge wherein a planar thickness of said left lens and said right lens is equal to or less than the planar thickness of said beam bridge and wherein said beam bridge is injection-molded with a square longitudinal cross section to thereby attain greater structural strength and further is integrally injection-molded with said left lens and said right lens.

2. The reading glasses set of claim 1 further comprising a narrowing of thickness in height and in width of said beam bridge beginning from its medial center and extending toward said right lens and said left lens thereby facilitating a compression of said right lens toward said left lens when compressed and affording an outward biasing when compression ceases.

3. The reading glasses set of claim 2 wherein said thickness and said height of said beam bridge at its medial center is approximately 10% greater than the thickness in height and width of said right lens and said left lens at their respective points of adjacency to said beam bridge.

4. Credit-card sized reading glasses set comprising:
(a) a pliable stow envelope critically sized in length and width as to dimensionally stack with conventional credit cards; and
(b) pince-nez eyeglasses removably insertable into and from said stow envelope, said pince-nez eyeglasses having a flexible beam bridge with a planar thickness and a rimless left lens attached to one side of said beam bridge and a rimless right lens attached to an opposite side of said beam bridge wherein a planar thickness of said left lens and said right lens is equal to or less than the planar thickness of said beam bridge and wherein said beam bridge further comprises a narrowing of thickness in height and in width beginning from its medial center and extending toward said right lens and said left lens thereby facilitating a compression of said right lens toward said left lens when compressed and affording an outward biasing when compression ceases.

5. The reading glasses set of claim 4 wherein said beam bridge is injection-molded with a square longitudinal cross section to thereby attain greater structural strength and further is integrally injection-molded with said left lens and said right lens.

6. The reading glass set of claim 4 wherein said thickness and said height of said beam bridge at its medial center is approximately 10% greater than the thickness in height and width of said right lens and said left lens at their respective points of adjacency with said beam bridge.

7. Pince-nez reading glasses comprising:
(a) a flexible beam bridge;
(b) a rimless left lens attached to one side of said beam bridge; and
(c) a rimless right lens attached to an opposite side of said beam bridge wherein said beam bridge narrows in thickness in height and in width beginning from its medial center and extending toward said right lens and said left lens thereby facilitating a compression of said right lens toward said left lens when compressed and affording an outward biasing when compression ceases and wherein said beam bridge is injection-molded with a square longitudinal cross section to thereby attain greater structural strength and further integrally injection-molded with said left lens and said right lens.

8. The reading glasses set of claim 7 wherein said thickness and said height of said beam bridge at its medial center is approximately 10% greater than the thickness in height and width of said right lens and said left lens at their respective points of adjacency to said beam bridge.

* * * * *

UNITED STATES PATENT AND TRADEMARK OFFICE
CERTIFICATE OF CORRECTION

PATENT NO. : 7,117,990 B2 Page 1 of 1
APPLICATION NO. : 10/862639
DATED : October 10, 2006
INVENTOR(S) : Richard A. Sarif It is certified that error appears in the above-identified patent and that said Letters Patent is hereby corrected as shown below:

Item (73)

<u>Title page</u>

Item (73) Assignee:,
    Change "SoirtRX, Inc., San Diego, CA (US)" to
    -- SportRX, Inc., San Diego, CA (US) --.

Signed and Sealed this

Thirtieth Day of October, 2007

JON W. DUDAS
*Director of the United States Patent and Trademark Office*